Jan. 16, 1940.   M. F. A. JULIEN   2,187,706
POWER TRANSMITTING COUPLING
Filed Oct. 20, 1936

Patented Jan. 16, 1940

2,187,706

UNITED STATES PATENT OFFICE 2,187,706

POWER TRANSMITTING COUPLING

Maurice François Alexandre Julien,
Paris, France

Application October 20, 1936, Serial No. 106,578
In Germany January 25, 1936

2 Claims. (Cl. 64—11)

My invention relates to shaft couplings and more especially to a coupling transmitting power from one shaft to another extending at a variable angle to the other.

It is the object of my invention to provide a coupling of this kind which is simpler in design and more efficient in action than other couplings hitherto proposed.

The problem of connecting two shafts extending at an obtuse angle to each other has been solved by coupling the shafts with the aid of one or a plurality of joints of the Cardan joint type. In the case of motor vehicles, power transmission from one shaft to another extending at an angle to it, is complicated by the circumstance that, if one of the two shafts carries the wheels, these wheels are subject to fluttering movements, whereby the angle, at which the wheel axle extends relative to the driving shaft, varies within considerable limits.

In order to be able to transmit power under these circumstances, the following conditions must be fulfilled:

1. The transmission of movement from the shaft to the wheel axle must occur homokinetically.
2. The power transmitting coupling must remain operative up to the angle, enclosed between the driving shaft and the wheel axle, between $+30°$ and $-30°$.
3. The torsional elasticity of the transmission must have a rather important value.
4. In most cases, the transmission must admit a change of length and/or a longitudinal displacement of one shaft relative to the other.
5. Lubrication and attendance must be reduced to a minimum.

A homokinetic transmission of movements can be obtained by using a double Cardan joint or certain circumstantial and little resistive devices. These solutions of the problem merely fulfil the first two conditions. It has also been suggested to use elastic joints comprising rubber lined with a fabric. However such joints do not admit the angular positions required in such case and possess only a very low peak elasticity. Besides this, all of the aforesaid joints must generally be combined with a longitudinally movable sleeve, which results in the provision of a plurality of members, which fulfil their purpose only in combination with each other. This is particularly the case with short shafts such as the shaft driving the steering and driving front wheels, where a number of members are required to be combined, each of which fulfils one or a plurality of the above conditions.

Torsional elasticity can be obtained with the aid of certain yielding coupling means such as for instance the so-called silent-blocks, which are arranged in such manner that the rubber ring is stressed merely for torsion. It is however impossible, when using such links, to obtain at the same time a high freedom of movement in the direction of the axle and large variations of angle between the two shafts driven by such joints are not admitted.

Variations in the length of the power transmission are as a rule provided for by a sliding catch or driving device; however, in view of the high stresses acting on adjoining flanks of the splines, such sliding devices are subject to sticking. The axial effort to be exerted in such a case, in order to overcome the friction, is transmitted on to the joints, the wheel bearings and the differential, which gives rise to obnoxious shocks and vibrations, to fatigue and wear of the members. In order to avoid this, balls and rollers have been inserted between the splines, but the device is complicated and its price raised thereby.

Therefore, if it is desired to provide an ideal power transmission in cases such as are encountered in the driving and steering front wheels of motor vehicles, it is not only necessary to use homokinetic joints, but these joints must also be combined with costly and complicated organs in order to impart to the power transmission those properties which would otherwise be lacking.

The present invention relates to a universal joint, in which a single member fulfils all the conditions, enumerated above, which are required for an ideal power transmission, and this even in the case of a variability (from $+30°$ to $-30°$) of the wheel suspension and with the maximum steering angle of the wheels.

The novel joint or coupling according to this invention is characterized by the feature that it comprises a coupling member consisting of a group, or of a plurality of groups coupled with each other, of members consisting of an elastic material, the circumferential surface of this group being the surface of a ring collar, the cross section of which is a simple rectangle or a rectangle with curved sides, the axis of the collar coinciding approximately with the pivot point of the shafts to be coupled or with the shafts themselves whenever they are arranged in alignment. One of these shafts is rigidly connected to the outer part of the collar surface, the other shaft to the inner part. The group of elastic members is further characterized by a very high torsional elasticity in the sense of the rotary movement and by a high elasticity in the direction of the axis, which corresponds to the relative longitudinal movement of the shafts and a high traversal deformation elasticity, which corresponds to the relative angular displacements of the shafts.

In the drawing affixed to this specification and forming part thereof, an embodiment of my invention is illustrated diagrammatically by way of example.

In the drawing,

Fig. 1 is an axial section of one form of the new coupling, while

The elastic members according to this invention are formed of a plastic and elastic mass, for instance rubber, which is subdivided into a plurality of concentric rings. The outermost of these rings is fixed, by vulcanization or in some other manner, to a metal ring or collar surrounding it, and similar metal rings are inserted between the adjoining concentric rubber rings.

The transmission of the turning movement thus occurs with a certain peak elasticity and if the rubber rings are not too thick, they will be sufficiently elastic to allow for relative axial displacements and angular adjustments of the shafts which will be the greater, the thinner the rings in proportion to their width. For practical reasons I prefer making the ratio of the diameter of the outer hub surface and that of the outermost rubber ring approximately equal to ½ or even less. I also prefer making the rings equally or less thick than wide.

The rubber rings may have different thicknesses in different places, for from a theoretical standpoint, in order to obtain at all points the same torsional stress, their thickness should change from the middle toward the periphery of the coupling according to a hyperbolic rule. However if one examines the distribution of stresses in a ring which is strongly deformed by torsion, one will see that it is advantageous to provide that the thickness first diminishes from the hub and, after passing through a minimum, again increases in the direction towards the outer metal collar.

Figure 1:
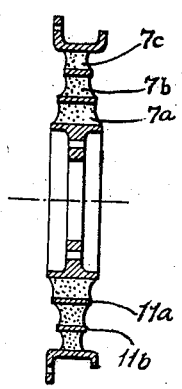
Figure 2:
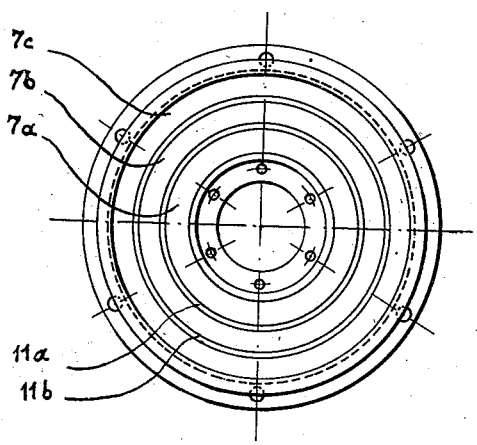
Fig. 2 is a plan view.

In Figs. 1 and 2 the elastic body is subdivided into three concentric rings 7a, 7b, 7c, separated by two metal rings 11a, 11b, embedded in the elastic mass. In this manner the distribution of tension during the torsional deformations is improved and the thickness of the elastic ring sections is varied approximately according to the theoretical hyberbolic rule.

I wish it to be understood that I do not desire to be limited to the exact details of construction shown and described for obvious modifications will occur to a person skilled in the art.

I claim:

1. A universal joint for transmitting power with a considerable torsional conical and axial elasticity from a driving shaft to a driven shaft in substantial alignment therewith and comprising in concentric relation an outer drum connected to one shaft, an inner hub connected to the other shaft, said inner hub having a diameter smaller than ⅔ the diameter of the said drum, and an elastic coupling member extending between and connecting said drum and said hub, said elastic coupling member having an annular shape with a minimum thickness in axial direction, said minimum thickness being smaller than the radial width of the said member between said hub and said drum, said elastic coupling member comprising a plurality of concentrically arranged annular bodies of an elastic material, closed metal rings being inserted between said annular bodies.

2. A universal joint for transmitting power with a considerable torsional conical and axial elasticity from a driving shaft to a driven shaft in substantial alignment therewith and comprising in concentric relation an outer drum connected to one shaft, an inner hub connected to the other shaft, said inner hub having a diameter smaller than ⅔ the diameter of the said drum, and an elastic coupling member extending between and connecting said drum and said hub, said elastic coupling member having an annular shape with a minimum thickness in axial direction, said minimum thickness being smaller than the radial width of the said member between said hub and said drum, said elastic coupling member comprising a plurality of concentrically arranged annular bodies of an elastic material, closed metal rings being inserted between said annular bodies, the thickness in axial direction of each inner body being greater than that of the outer body.

MAURICE FRANÇOIS ALEXANDRE
JULIEN.